US011306797B2

(12) United States Patent
Lin

(10) Patent No.: US 11,306,797 B2
(45) Date of Patent: Apr. 19, 2022

(54) TOP CAP ASSEMBLY FOR SHOCK ABSORBER

(71) Applicant: JIHZHAN INTERNATIONAL CO., LTD., Taichung (TW)

(72) Inventor: Wei-Li Lin, Taichung (TW)

(73) Assignee: JIHZHAN INTERNATIONAL CO., LTD., Taichung (TW)

( * ) Notice: Subject to any disclaimer, the term of this patent is extended or adjusted under 35 U.S.C. 154(b) by 11 days.

(21) Appl. No.: 16/921,834

(22) Filed: Jul. 6, 2020

(65) Prior Publication Data

US 2022/0003294 A1 Jan. 6, 2022

(51) Int. Cl.
F16F 9/54 (2006.01)
F16F 9/348 (2006.01)
F16F 9/32 (2006.01)

(52) U.S. Cl.
CPC .......... F16F 9/3484 (2013.01); F16F 9/3242 (2013.01)

(58) Field of Classification Search
CPC ...... F16F 9/3221; F16F 9/3207; F16F 9/3271; F16F 9/54; F16F 9/3242; F16F 13/007; F16J 1/12; F01L 3/10; B60G 2202/312; B60G 15/06; B60G 15/062; B60G 15/063; B60G 2204/128
See application file for complete search history.

(56) References Cited

U.S. PATENT DOCUMENTS

| 2,759,466 | A | * | 8/1956 | Heimbuch | F01L 3/08 |
| | | | | | 123/90.37 |
| 4,438,908 | A | * | 3/1984 | Terada | B60G 15/062 |
| | | | | | 188/321.11 |
| 5,213,072 | A | * | 5/1993 | Dohring | F01L 1/143 |
| | | | | | 123/90.37 |
| 6,398,202 | B1 | * | 6/2002 | Schaible | B60G 13/003 |
| | | | | | 188/321.11 |

FOREIGN PATENT DOCUMENTS

DE      102007018161 A1 * 10/2008 ............. F16F 9/369

* cited by examiner

*Primary Examiner* — Robert A. Siconolfi
*Assistant Examiner* — Stephen M Bowes
(74) *Attorney, Agent, or Firm* — Pai Patent & Trademark Law Firm; Chao-Chang David Pai

(57) ABSTRACT

A top cap assembly for a shock absorber includes a cap which has a first locking member connected to the center thereof, and an inner plate which has a second locking member connected to the center thereof. A first section of a piston rod extends through the first passage of the first locking member and is restricted by the first ridge of the first passage. A second section of the piston rod extends through the second passage of the second locking member and is restricted by the second ridge of the second passage. When installing the top cap assembly to different shock absorbers with different diameters, only the first locking member and the second locking member need to be replaced, and the cap and the inner plate do not need to be replaced.

9 Claims, 9 Drawing Sheets

TOP CAP ASSEMBLY FOR SHOCK ABSORBER

BACKGROUND OF THE INVENTION

1. Fields of the Invention

The present invention relates to a shock absorber, and more particularly, to a top cap assembly for a shock absorber.

2. Descriptions of Related Art

As shown in FIG. 1, the conventional shock absorber for vehicles generally comprises a tube 10, a piston rod 12, a coil spring 13, a bottom plate 14, a top cap assembly 15 and a top mount plate 16.

The section below the tube 10 is connected to a vehicle shaft (not shown) by a connection mechanism (not shown). The piston rod 12 is movable axially and extends through the tube 10. The connection between the piston rod 12 and the tube 10 will not be described here. The top section of the piston rod 12 extends beyond the top of the tube 10. The coil spring 13 is mounted outside of the tube 10. The lower end of the coil spring 13 is supported by the bottom plate 14 which is secured to the toothed sleeve 101 of the tube 10. The top end of the coil spring 13 contacts the top cap assembly 15. The top section of the piston rod 12 extends through the center of the top cap assembly 15 so as to be connected with the top mount plate 16 which is connected to the body of the vehicle (not shown) by multiple bolts.

As shown in FIGS. 2 to 5, the top cap assembly 15 includes a cap 151 and an inner plate 153. The cap 151 includes a room defined therein and has an opening formed in the lower end thereof. The inner plate 153 is a disk-shaped part and is connected to the inner top end of the room of the cap 151. The inner plate 153 has an annular groove 155 defined in an underside thereof so as to accommodate the top end of the coil spring 13. The inner plate 153 and the cap 151 each have a hole 152/154 defined through the center thereof so that the top section of the piston rod 12 extends therethrough. The top section of the piston 12 includes multiple sections with different diameters. The holes 152 and 154 each have corresponding sections with different diameters.

The diameters of the piston rods 12 of different shock absorbers vary according to different types of vehicles and needs. In order to fit the diameters of the piston rods 12, the manufacturers have to prepare the inner plate 153 and the cap 151 with different holes 152, 154. This increases manufacturing cost and inventory pressure.

The present invention intends to provide a top cap assembly for a shock absorber to eliminate the shortcomings mentioned above.

SUMMARY OF THE INVENTION

The present invention relates to a top cap assembly for a shock absorber. The shock absorber includes a coil spring which contacts the top cap assembly. A piston rod of the shock absorber extends through the top cap assembly and is connected with a top munt plate.

The top cap assembly comprises a cap. A first locking member is connected to the center of the cap by a first connection assembly. The first locking member has a first passage defined through the center thereof. The first passage includes at least one first ridge extending from the inner periphery thereof. A first section of the piston rod extends through the first passage and is restricted by the at least one first ridge. The piston rod is movable axially.

An inner plate is located in the cap, and the top end of the coil spring contacts the underside of the inner plate. A second locking member is connected to the center of the inner plate by a second connection assembly. The second locking member has a second passage defined through the center thereof. The second passage includes at least one second ridge extending from the inner periphery thereof. A second section of the piston rod extending through the second passage and is restricted by the at least one second ridge. The piston rod is movable axially.

The advantages of the present invention are that only the first locking member and the second locking member need to be replaced when installing the top cap assembly to different shock absorbers with different diameters. The cap and the inner plate do not need to be replaced.

The first and second locking members are easily and precisely connected to the inner plate and the cap. The piston rod is stably restricted in the radial direction to avoid inclination which causes noise and unstable movement.

The present invention will become more obvious from the following description when taken in conjunction with the accompanying drawings which show, for purposes of illustration only, a preferred embodiment in accordance with the present invention.

DETAILED DESCRIPTION OF THE PREFERRED EMBODIMENT

Figure 1:
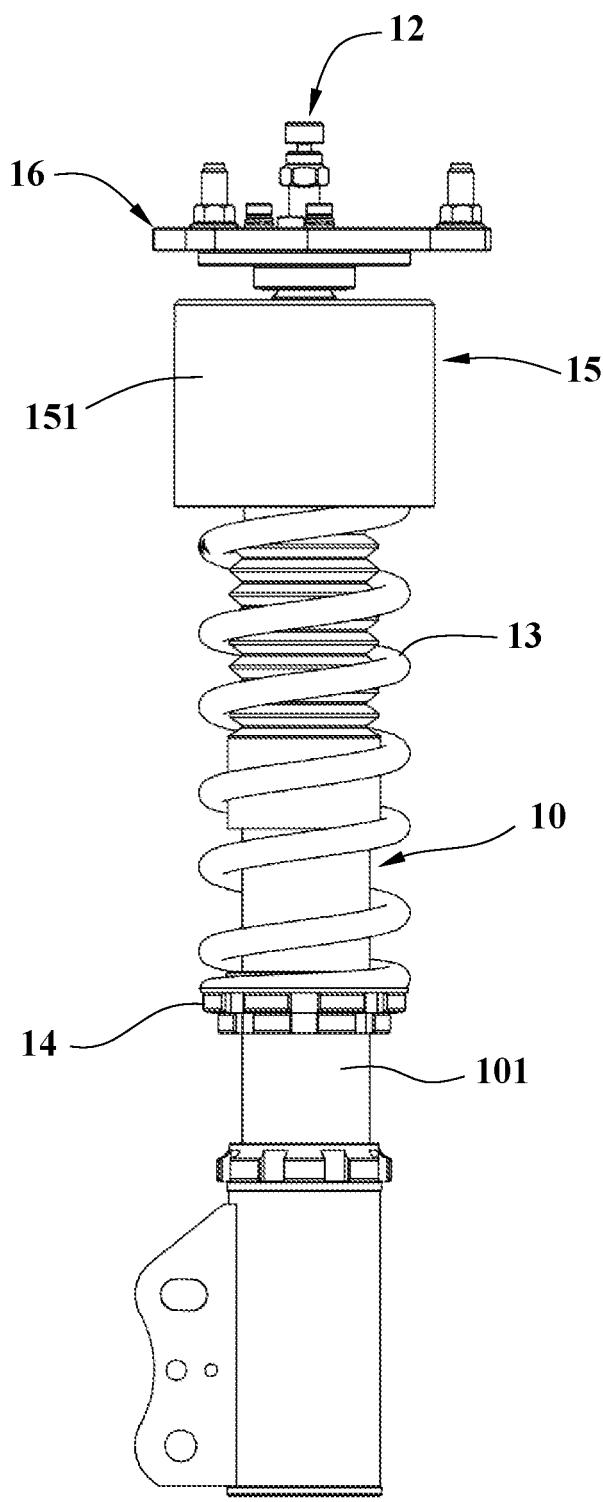
FIG. 1 shows a conventional shock absorber.
Figure 2:
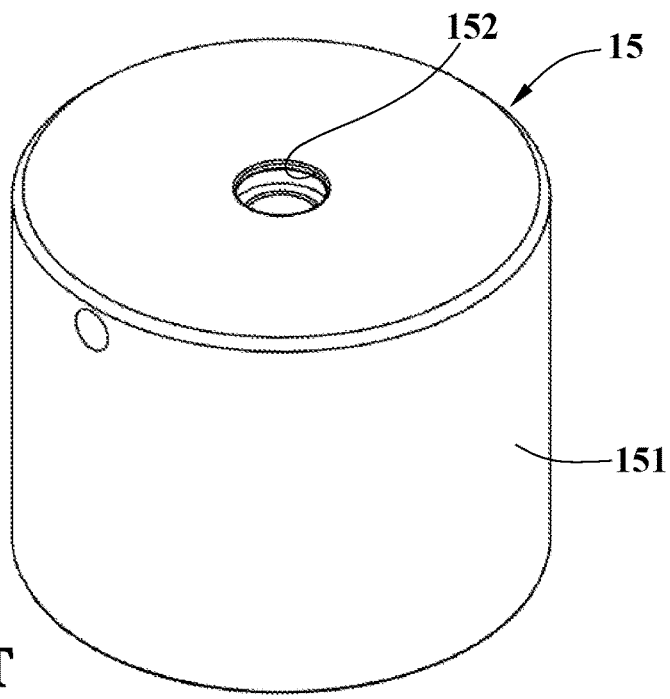
FIG. 2 shows the top cap assembly of the conventional shock absorber.
Figure 4:
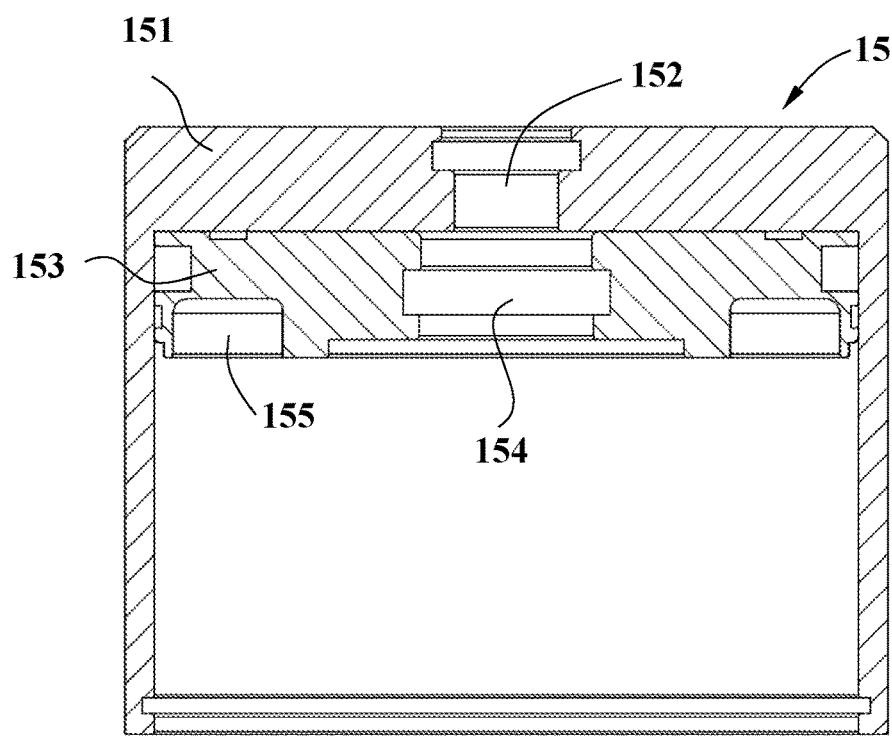
FIG. 4 is a cross sectional view of the top cap assembly of the conventional shock absorber.
Figure 3:
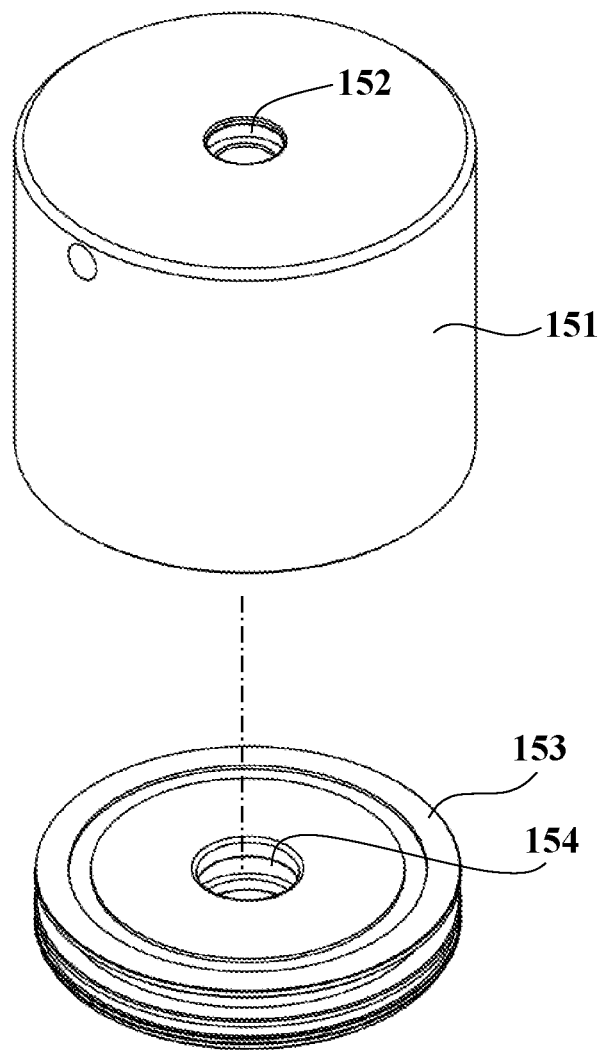
FIG. 3 is an exploded view of the top cap assembly of the conventional shock absorber.
Figure 5:
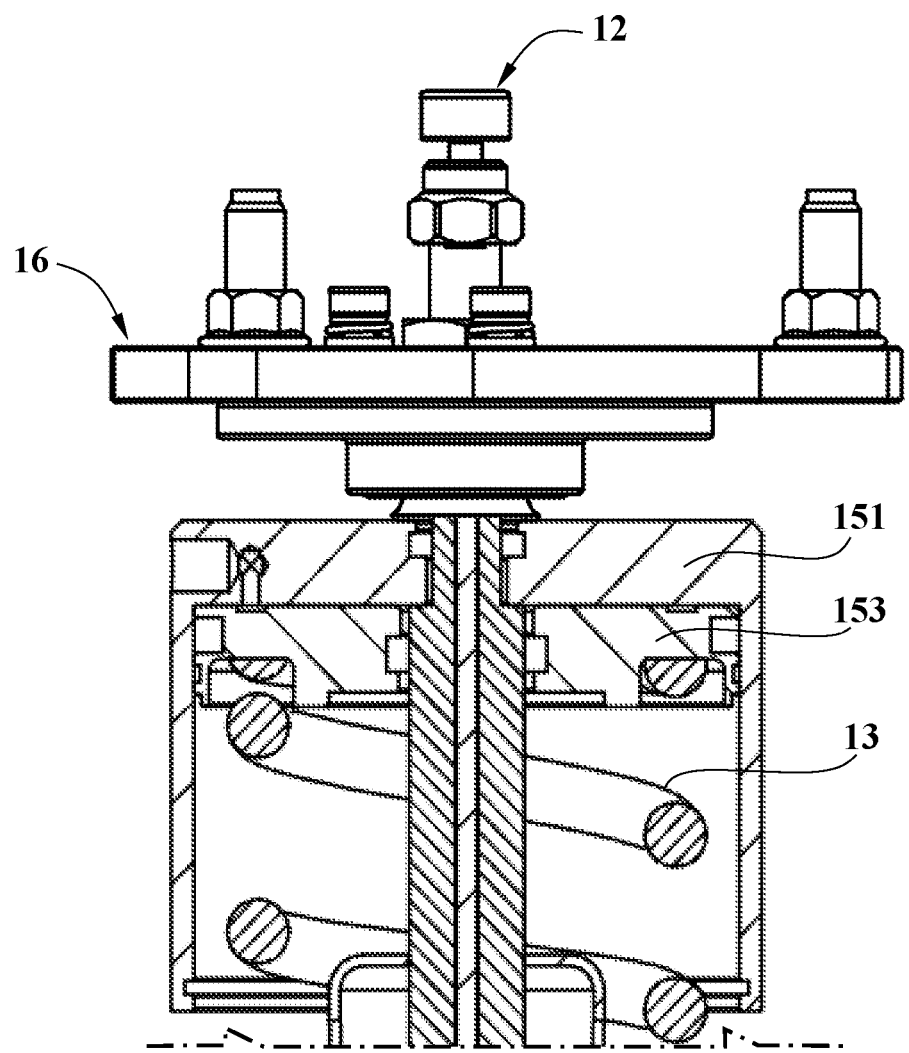
FIG. 5 is a cross sectional view showing the assembly of the top cap assembly, the piston rod and the top mount plate of the conventional shock absorber.
Figure 6:
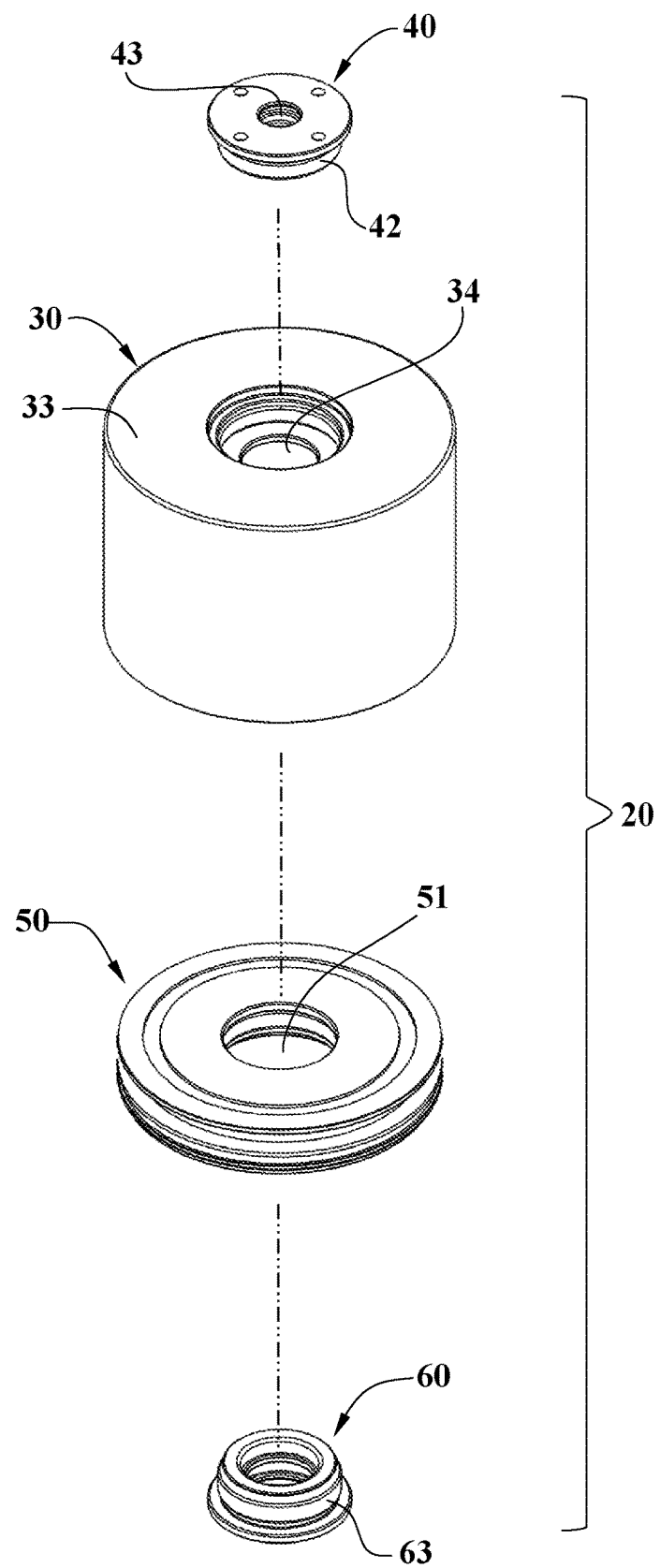
FIG. 6 is an exploded view of the top cap assembly of the present invention.
Figure 7:
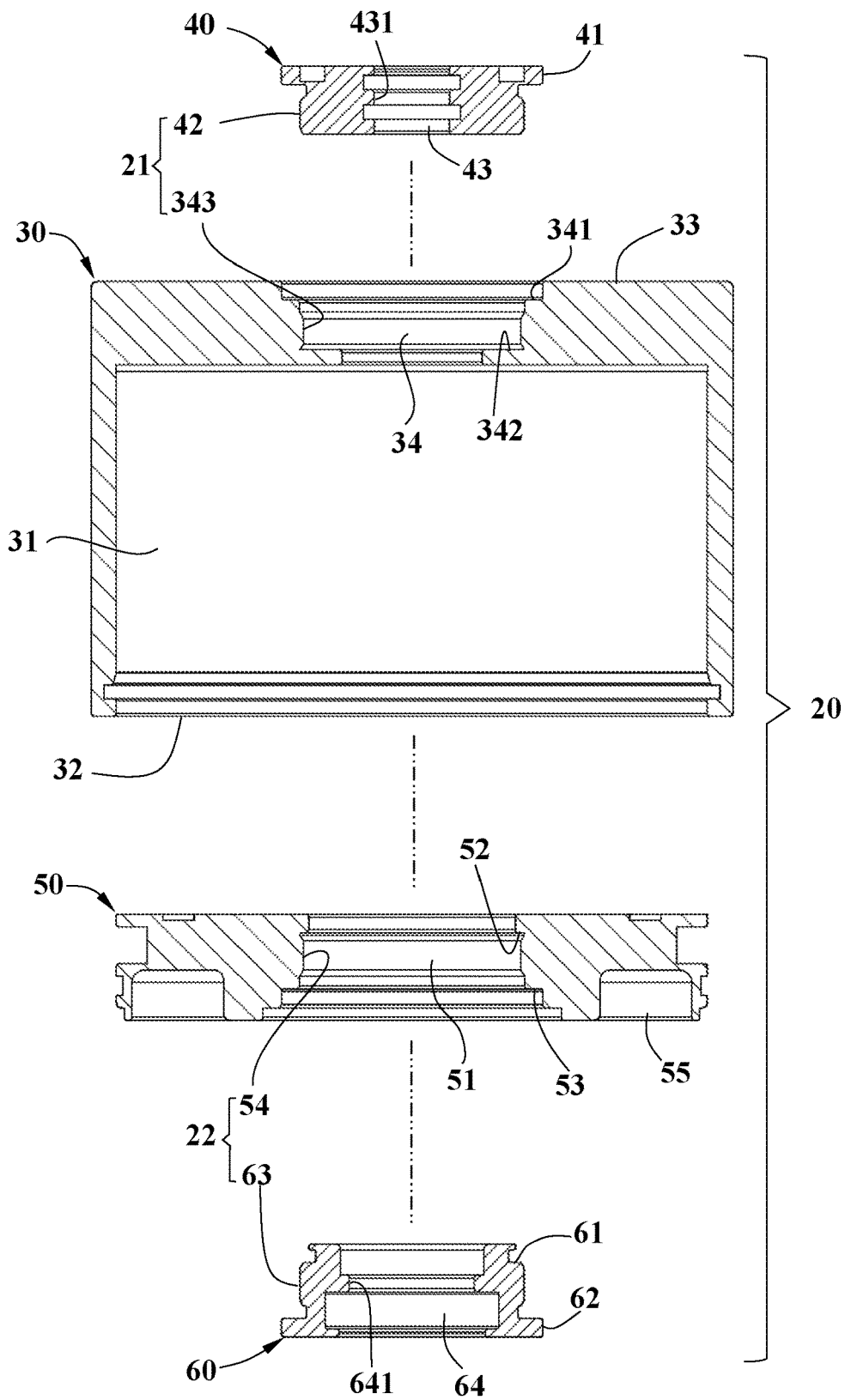
FIG. 7 is an exploded and cross sectional view of the top cap assembly of the present invention.
Figure 8:
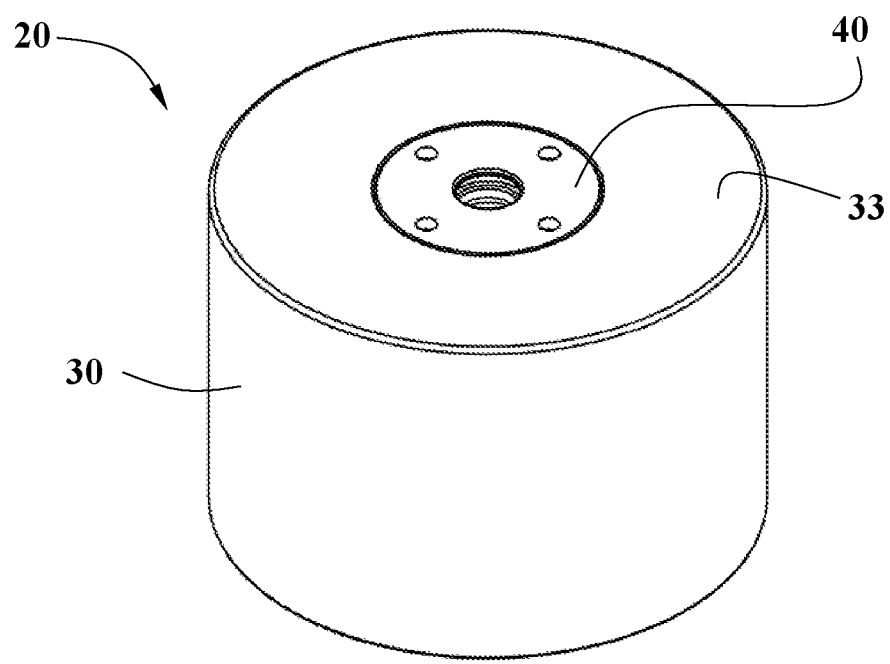
FIG. 8 is a perspective view of the top cap assembly of the present invention.
Figure 9:
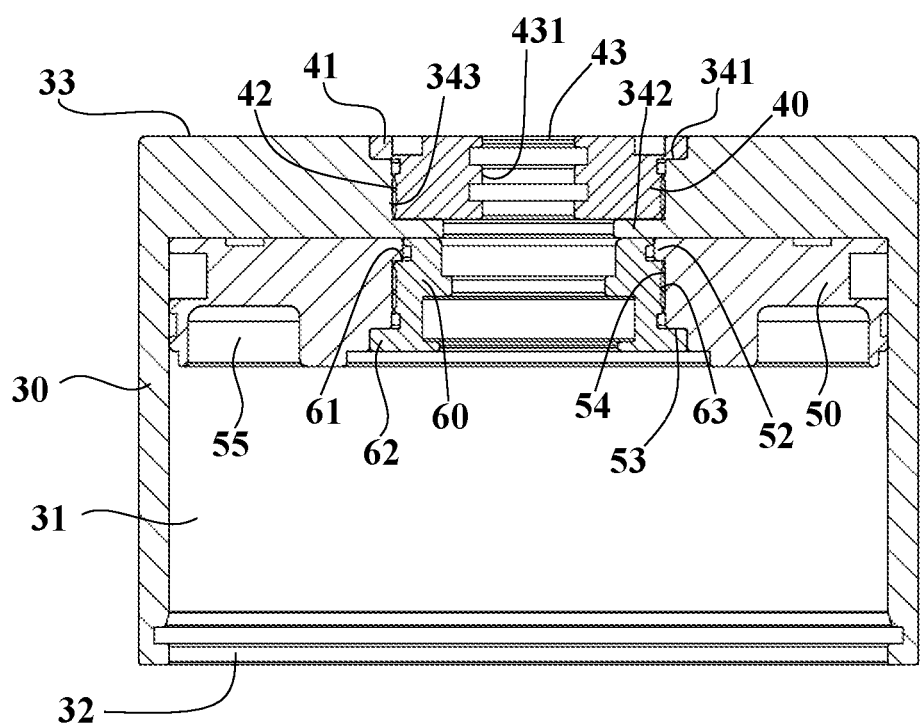
FIG. 9 is a cross sectional view of the top cap assembly of the present invention.

In order to describe the present invention, an embodiment of the present invention is hereinafter described. Different parts are drawn according to proper ratio, specification, deformation or displacement, not the real ratio of the parts. The identical and correspondent parts are assigned the same reference numbers. In addition, descriptions referring to top, bottom, left, right, front and rear of parts are based on the disclosure of the drawings and are not to limit the parts.

As shown in FIGS. 6 to 9, the top cap assembly 20 for a shock absorber 70 of the present invention comprises a cap 30, an inner plate 50, a first locking member 40 and a second locking member 60. The first locking member 40 is connected to the center of the cap 30 by a first connection assembly 21. The second locking member 60 is connected to the center of the inner plate 50 by a second connection assembly 22. The first and second connection assemblies 21, 22 include threads.

The cap 30 is a tubular part and includes a room 31 defined therein. An opening 32 is formed at the underside of the cap 30. A first hole 34 is defined through the center of the top face 33 of the cap 30. The inner periphery of the first hole 34 is a stepped inner periphery. The first hole 34 includes a first shoulder 341 and a second shoulder 342 formed in the inner periphery thereof. A first threaded section 343 is formed between the first shoulder 341 and the second shoulder 342.

The first locking member 40 is connected to the first hole 34. The first locking member 40 has a stepped outer periphery and includes a first flange 41 extending radially from the outer periphery. A second threaded section 42 is formed at the outer periphery of the first locking member 40 and located beneath the first flange 41. The first locking member 40 includes a first passage 43 defined through the center thereof. The first passage 43 has a stepped inner periphery and includes at least one first ridge 431 extending from the inner periphery. The diameter of the first passage 43 is designed for engaging with the outer shape of a first section 731 of the piston rod 73. The first locking member 40 is connected to the first hole 34 of the cap 30 from top of the cap 30. The first locking member 40 is connected to the first hole 34 by the first connection assembly 21, which is implemented by connection between the first threaded section 343 and the second threaded section 42. The first flange 41 is rested on the first shoulder 341. The underside of the first locking member 40 is rested on the second shoulder 342.

The inner plate 50 is a disk-shaped part and is located in the cap 30. The inner plate 50 contacts the inner bottom of the top face 33 of the cap 30. The inner plate 50 includes a second hole 51 defined through the center thereof. The second hole 51 has a stepped inner periphery and includes a third shoulder 52 and a fourth shoulder 53 formed in the inner periphery. A third threaded section 54 is formed between the third shoulder 52 and the fourth shoulder 53. An annular groove 55 is formed at the underside of the inner plate 50 and located around the second hole 51.

The second locking member 60 is connected to the second hole 51 and has a stepped outer periphery. The stepped outer periphery of the second locking member 60 includes a third flange 61 and a fourth flange 62 extending radially from the outer periphery. A fourth threaded section 63 is formed at the outer periphery of the second locking member 60 and located between the third flange 61 and the fourth flange 62. The second locking member 60 includes a second passage 64 defined through the center thereof. The second passage 64 has a stepped inner periphery and includes at least one second ridge 641 extending from the inner periphery. The at least one second ridge 641 is sized to be engaged with the diameter of the second section 732 of the piston rod 73 of the shock absorber 70. The second locking member 60 is inserted into the second hole 51 from the underside of the inner plate 50. The second locking member 60 is connected to the inner plate 50 by the second connection assembly 22, which is implemented by connection between the third threaded section 54 and the fourth threaded section 63. The third flange 61 contacts the third shoulder 52, and the fourth flange 62 contacts the fourth shoulder 53.

Figure 10:
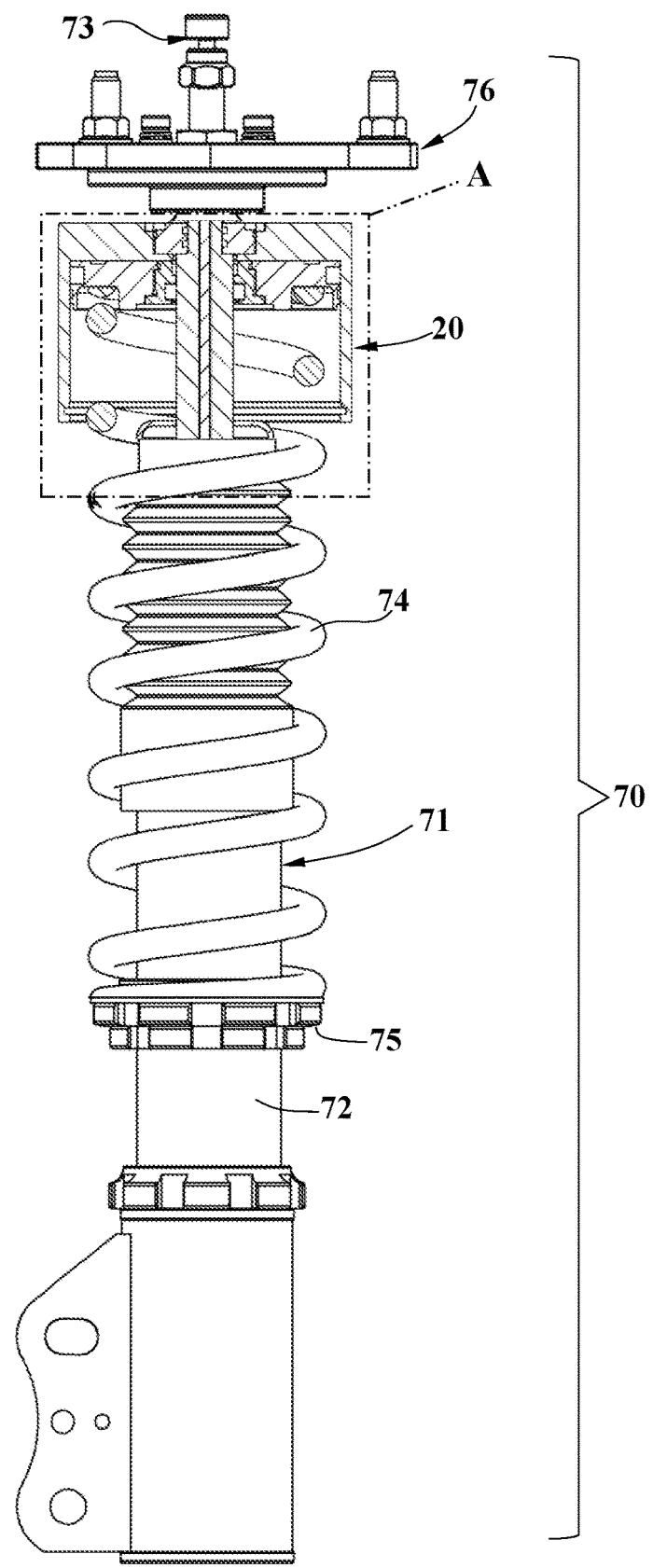
FIG. 10 is a cross sectional view showing the assembly of the top cap assembly, the piston rod and the top mount plate of the present invention.
Figure 11:
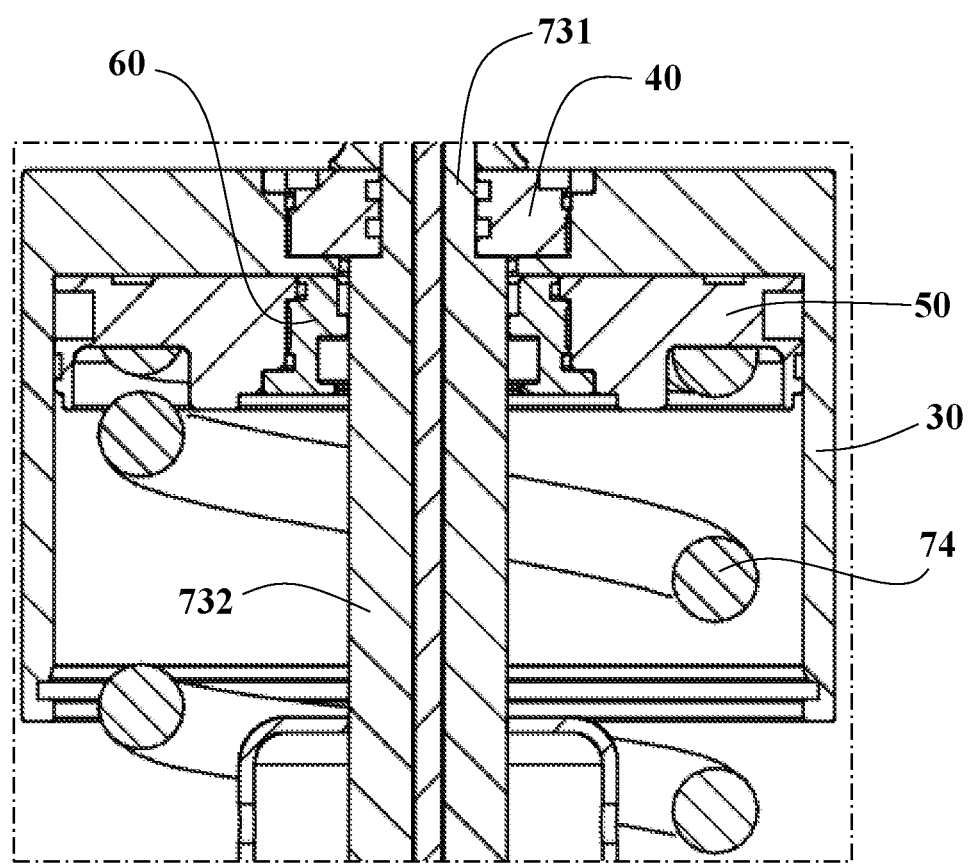
FIG. 11 is an enclosed cross sectional view of the area "A" in FIG. 10.

As shown in FIGS. 10 and 11, the top cap assembly 20 is installed to a shock absorber 70 which includes a tube 71, a piston rod 73, a coil spring 74, a locking perch 75 and a top mount plate 76. The lower section of the tube 71 is connected to a shaft of a vehicle (both not shown) via a connection mechanism (not shown). The piston rod 73 axially extends through the tube 71. The connection and operation of the piston rod 73 and the tube 71 are well known and will not be described here. The first section 731 and the second section 732 of the piston rod 73 extend beyond the top of the tube 71. The diameter of the second section 732 is larger than that of the first section 731. The coil spring 74 is mounted to outside of the tube 71. The lower end of the coil spring 74 is connected to the locking perch 75 of the threaded sleeve 72 of the tube 71.

The second section 732 of the piston rod 73 extends through the second passage 64 of the second locking member 60 and is restricted by the at least one second ridge 641 in radial direction. The second section 732 of the piston rod 73 is movable axially. The top end of the coil spring 74 is inserted into the cap 30 and is engaged with the annular groove 55 of the inner plate 50. The first locking member 40 is mounted to outside of the first section 731 of the piston rod 73, and is secured to the first hole 34. The first section 731 of the piston rod 73 is restricted by the first ridge 431 in radial direction. The first section 731 of the piston rod 73 is movable axially. The top mount plate 76 is connected to the top of the piston rod 73, and the top mount plate 76 is connected to the body of the vehicle (not shown) by multiple bolts. The top mount plate 76 is well known and not described here.

The shock absorber 70 buffers the shocks from transferring to the vehicle by its resilient movement. The diameter of the piston rod 73 of the shock absorber 70 of different vehicles is different. In order to meet the needs of the different dimeters of the piston rods 73 of the shock absorbers 70, the first and second locking members 40, 60 of the top cap assembly 20 of the present invention are the only two parts to be replaced. The inner plate 50 and the cap 30 do not need to be replaced. The first and second locking members 40, 60 of the present invention can easily and precisely be connected to the inner plate 50 and the cap 30. The piston rod 73 is stably restricted in the radial direction to avoid inclination which causes noise and unstable movement.

While we have shown and described the embodiment in accordance with the present invention, it should be clear to those skilled in the art that further embodiments may be made without departing from the scope of the present invention.

What is claimed is:

1. A top cap assembly for a shock absorber having a coil spring contacting the top cap assembly, a piston rod extending through the top cap assembly, and a top mount plate connected with the piston rod, the top cap assembly comprising:

a cap, wherein a top face of the cap includes a first hole defined through a center thereof, the first hole includes a first shoulder and a second shoulder formed in an inner periphery thereof, and a first threaded section is formed between the first and second shoulders;

a first locking member connected to the first hole of the cap by a first connection assembly, the first locking member having a first passage defined through a center thereof, a first flange extending radially from an outer periphery thereof, and a second threaded section formed at the outer periphery thereof and located beneath the first flange, wherein the first passage includes at least one first ridge extending from an inner periphery thereof, and a first section of the piston rod extends through the first passage and is restricted by the at least one first ridge;

an inner plate located in the cap, wherein an underside of the inner plate contacts a top end of the coil spring; and a second locking member connected to a center of the inner plate by a second connection assembly, the second locking member having a second passage defined through a center thereof, the second passage including at least one second ridge extending from an inner periphery thereof, wherein a second section of the piston rod extends through the second passage and is restricted by the at least one second ridge, wherein the first locking member is connected to the first hole of the cap by the first connection assembly implemented by connection between the first threaded section and the second threaded section, the first flange is rested on the first shoulder, and an underside of the first locking member is rested on the second shoulder.

2. The top cap assembly for a shock absorber as claimed in claim 1, wherein the first connection assembly includes threads.

3. The top cap assembly for a shock absorber as claimed in claim 2, wherein the second connection assembly includes threads.

4. A top cap assembly for a shock absorber having a coil spring contacting the top cap assembly, a piston rod extending through the top cap assembly, and a top mount plate connected with the piston rod, the top cap assembly comprising:

a cap;

a first locking member connected to a center of the cap by a first connection assembly, the first locking member having a first passage defined through a center thereof, the first passage including at least one first ridge extending from an inner periphery thereof, wherein a first section of the piston rod extends through the first passage and is restricted by the at least one first ridge;

an inner plate located in the cap, wherein the inner plate includes a second hole defined through a center thereof, the second hole includes a third shoulder and a fourth shoulder formed in an inner periphery thereof, a third threaded section is formed between the third and fourth shoulders, and an underside of the inner plate contacts a top end of the coil spring; and a second locking member connected to the second hole of the inner plate by a second connection assembly, the second locking member having a second passage defined through a center thereof, a third flange and a fourth flange extending radially from an outer periphery thereof, and a fourth threaded section is formed at the outer periphery thereof and located between the third flange and the fourth flange, wherein the second passage includes at least one second ridge extending from an inner periphery thereof, and a second section of the piston rod extends through the second passage and is restricted by the at least one second ridge, wherein the second locking member is connected to the second hole of the inner plate by the second connection assembly implemented by connection between the third threaded section and the fourth threaded section, the third flange contacts the third shoulder, and the fourth flange contacts the fourth shoulder.

5. The top cap assembly for a shock absorber as claimed in claim 4, wherein the first connection assembly includes threads.

6. The top cap assembly for a shock absorber as claimed in claim 5, wherein the second connection assembly includes threads.

7. A top cap assembly for a shock absorber having a coil spring contacting the top cap assembly, a piston rod extending through the top cap assembly, and a top mount plate connected with the piston rod, the top cap assembly comprising:

a cap, wherein a top face of the cap includes a first hole defined through a center thereof, the first hole includes a first shoulder and a second shoulder formed in an inner periphery thereof, and a first threaded section is formed between the first and second shoulders;

a first locking member connected to the first hole of the cap by a first connection assembly, the first locking member having a first passage defined through a center thereof, a first flange extending radially from an outer periphery thereof, and a second threaded section formed at the outer periphery thereof and located beneath the first flange, wherein the first passage includes at least one first ridge extending from an inner periphery thereof, and a first section of the piston rod extends through the first passage and is restricted by the at least one first ridge;

an inner plate located in the cap, wherein the inner plate includes a second hole defined through a center thereof, the second hole includes a third shoulder and a fourth shoulder formed in an inner periphery thereof, a third threaded section is formed between the third and fourth shoulders, and an underside of the inner plate contacts a top end of the coil spring; and a second locking member connected to the second hole of the inner plate by a second connection assembly, the second locking member having a second passage defined through a center thereof, a third flange and a fourth flange extending radially from an outer periphery thereof, and a fourth threaded section is formed at the outer periphery thereof and located between the third flange and the fourth flange, wherein the second passage includes at least one second ridge extending from an inner periphery thereof, and a second section of the piston rod extends through the second passage and is restricted by the at least one second ridge, wherein the first locking member is connected to the first hole of the cap by the first connection assembly implemented by connection between the first threaded section and the second threaded section, the first flange is rested on the first shoulder, and an underside of the first locking member is rested on the second shoulder, wherein the second locking member is connected to the second hole of the inner plate by the second connection assembly implemented by connection between the third threaded section and the fourth threaded section, the third flange contacts the third shoulder, and the fourth flange contacts the fourth shoulder.

8. The top cap assembly for a shock absorber as claimed in claim 7, wherein the first connection assembly includes threads.

9. The top cap assembly for a shock absorber as claimed in claim 8, wherein the second connection assembly includes threads.

* * * * *